United States Patent
Grigoryan et al.

(10) Patent No.: US 10,572,229 B2
(45) Date of Patent: Feb. 25, 2020

(54) SYSTEMS, METHOD, AND NON-TRANSITORY COMPUTER-READABLE STORAGE MEDIA FOR DISPLAYING SOFTWARE COMPONENTS

(71) Applicant: Wal-Mart Stores, Inc., Bentonville, AR (US)

(72) Inventors: Alexander Grigoryan, San Jose, CA (US); Arpan Y. Nanavati, Castro Valley, CA (US); Xiuhao Joel Chen, San Ramon, CA (US); Caoyang Shi, San Jose, CA (US); David Andrew Stevens, Las Vegas, NV (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/992,132

(22) Filed: May 29, 2018

(65) Prior Publication Data

US 2018/0275969 A1    Sep. 27, 2018

Related U.S. Application Data

(63) Continuation of application No. 15/394,413, filed on Dec. 29, 2016, now Pat. No. 9,983,855.

(51) Int. Cl.
*G06F 9/44* (2018.01)
*G06F 8/34* (2018.01)
*G06F 8/36* (2018.01)
*G06F 16/958* (2019.01)

(52) U.S. Cl.
CPC .................. *G06F 8/34* (2013.01); *G06F 8/36* (2013.01); *G06F 16/972* (2019.01)

(58) Field of Classification Search
CPC .... G06F 8/24; G06F 9/4428; G06F 17/30607; G06F 8/30; G06F 8/34
USPC .......................................................... 717/109
See application file for complete search history.

(56) References Cited

U.S. PATENT DOCUMENTS

2006/0070036 A1 * 3/2006 Cox ........................ G06F 9/451
717/124
2014/0013300 A1 * 1/2014 Shavlik ..................... G06F 8/65
717/120

* cited by examiner

Primary Examiner — Chuck O Kendall
(74) Attorney, Agent, or Firm — Bryan Cave Leighton Paisner LLP

(57) ABSTRACT

A system for use in displaying software components to a user is described herein. A system comprising one or more processors and one or more non-transitory memory storage devices storing computer instructions configured to run on the one or more processors and to perform accessing a data repository of a plurality of data repositories comprising at least one software component data file associated with a software component comprising a software code and an object data. Retrieving the at least one software component data file executing the software code and the object data associated with the at least one software component data file to render a demonstration image of the software component associated with the at least one software component data file. Generating a component display website to be displayed and comprising a component display area associated with the software component associated with the at least one software component data file.

20 Claims, 9 Drawing Sheets

Component Usage

This component is used in 5 modules / apps.

| | | |
|---|---|---|
| R-Discovery/BTV | 4.1.2 | BTV Module - Buy Together Value Module |
| react/product-inputs | ^6.0.0 | A quantity dropdown used in product page. |
| react/product-variants | ^6.0.0 | Set of components related to displaying product variants |
| react/questions | ^4.3.0 | |
| react/state-chooser | ^4.0.0 | |

[Hide Usage]

Module Dependencies

This component has 4 Electrode dependencies.

| | |
|---|---|
| @walmart/electrode-archetype-react-component | ^11.0.0 [dev] |
| @walmart/electrode-archetype-react-component-dev | ^11.0.0 [dev] |
| @walmart/electrode-demo-index | ^1.3.0 [dev] |
| @walmart/wmreact-analytics | ^5.0.1 |

[Hide Dependencies]

FIG. 7

SYSTEMS, METHOD, AND NON-TRANSITORY COMPUTER-READABLE STORAGE MEDIA FOR DISPLAYING SOFTWARE COMPONENTS

CROSS-REFERENCE TO RELATED APPLICATIONS

This application is a continuation of U.S. patent application Ser. No. 15/394,413, filed Dec. 29, 2016, now U.S. Pat. No. 9,983,855, which is incorporated herein by reference in its entirety.

FIELD OF THE DISCLOSURE

U.S. Patent Classification Primary Class: 707 (DATA PROCESSING: DATABASE, DATA MINING, AND FILE MANAGEMENT OR DATA STRUCTURES. Art Unit: 2161.

The present invention relates to software components, and more particularly, to systems, methods, and computer-readable storage media for use in displaying information associated with software components.

BACKGROUND

Many consumers desire to order items or goods remotely, e.g., on-line, through the Internet, or using a specially designed application or app on a personal computer or mobile device, such as a tablet or cell phone. At least some known website hosting systems include search engines that allow consumers to enter search criteria and generate search results based on the consumer's search criteria. Known search engines may generate and display product lists to consumers via a website including products that are selected based on the search criteria.

At least some known websites receive a significant number of monthly visitors with page loads up to 10,000 requests per second. In addition, at least some e-commerce websites add more than one million new items each month, which requires the development of new webpages and website capabilities to support user access to the additional items.

Developing new webpages and functionality to support the additional products and to utilize emerging user technologies presents significant challenges to organizations responsible for developing new websites and website functionality. Accordingly, it is desired to provide an improved computer server system that supports the development of software applications that are consistent, reliable, and follow the most scalable development practices, as well as support consistent webpage builds and deployments across projects.

The present invention is aimed at one or more of the problems identified above.

SUMMARY OF THE INVENTION

In different embodiments of the present invention, systems, methods, and computer-readable storage media implement a server computer system for organizing and displaying software component programming code.

In one embodiment of the present invention, a system for use in displaying software components to a user is provided. The system comprising one or more processors; and one or more non-transitory memory storage devices storing computer instructions configured to run on the one or more processors and to perform: accessing a data repository of a plurality of data repositories comprising at least one software component data file associated with a software component comprising a software code and an object data; retrieving the at least one software component data file; executing the software code and the object data associated with the at least one software component data file to render a demonstration image of the software component associated with the at least one software component data file; and generating a component display website to be displayed and comprising a component display area associated with the software component associated with the at least one software component data file.

In another embodiment of the present invention, one or more non-transitory computer-readable storage media, having computer-executable instructions embodied thereon are provided. One or more non-transitory computer-readable storage media, having computer-executable instructions embodied thereon and configured to run on at least one processor to cause the processor to: accessing a data repository of a plurality of data repositories comprising at least one software component data file associated with a software component comprising a software code and an object data; retrieving the at least one software component data file; executing the software code and the object data associated with the at least one software component data file to render a demonstration image of the software component associated with the at least one software component data file; and generating a component display website to be displayed and comprising a component display area associated with the software component associated with the at least one software component data file.

In yet another embodiment of the present invention, a method of operating a computer system for use in displaying software components to a user is provided. A method being implemented via execution of computing instructions configured to run at one or more processors and stored at one or more non-transitory computer-readable media, the method comprising: accessing a data repository of a plurality of data repositories comprising at least one software component data file associated with a software component comprising a software code and an object data; retrieving the at least one software component data file; executing the software code and the object data associated with the at least one software component data file to render a demonstration image of the software component associated with the at least one software component data file; and generating a component display website to be displayed and comprising a component display area associated with the software component associated with the at least one software component data file.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 4-7 are illustrations of an exemplary screenshots that may be generated by the system shown in FIG. 1, according to embodiments of the present invention.

Figure 1:
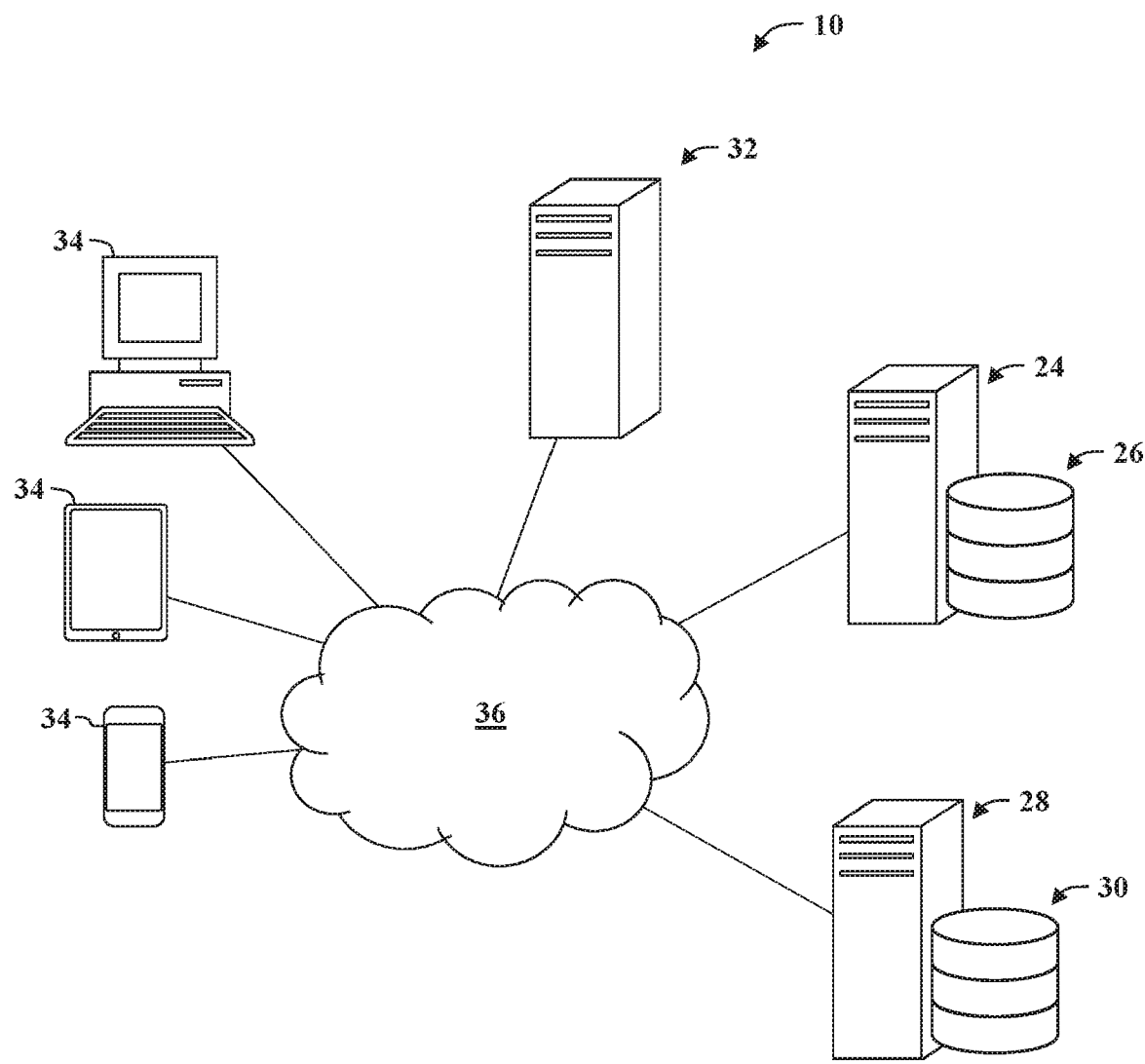
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

Walmart.com™ at Scale: In the illustrated embodiment, 80 million monthly visitors, loads up to 10,000 requests per second, and 15 million items, adding more than one million new items each month is what Walmart.com's™ scale is all about. With a large e-commerce business, it is desired to scale Walmart.com™ and to leverage the talent and creativity of the engineering base.

Core Goals: In e-commerce development, platform migration is serious business. Technology evolves constantly and it's important to move and adapt to stay competitive. However, transforming an engineering organization is a completely different story. With over a few hundred engineers, and dozens of applications, a system including the Electrode™ platform was developed to solve core problems that every large scale organization faces including streamlined development cycles, structure and best practices, and software code reuse:

Streamlined Development Cycle—it is desired to have developers to on-board and start new projects quickly to realize the end goal of reduced time to market. When starting a new application, there are a lot of technologies and configurations that developers have to glue together (such as rendering on the server side, redux, webpack configs, css modules, post css, deployment scripts, internationalization, javascript/css linting, karma/mocha configs, code coverage configs, etc). To jump start new applications, it is desired to combine all of that in one easy to use package with a scalable structure that follows best practices. This way the Electrode™ system allows developers to focus their attention on building features that customers want.

Structure and Best Practices—With hundreds of engineers across dozens of teams, it is desired to ensure that all of the applications are consistent and reliable, and follow the most scalable development practices. It is also needed to focus results in consistent builds and deployments across projects, along with great scaffolding to start developers off on the right path. Electrode'S™ predefined archetype system provides best practices and structures for building scalable applications that can be trust.

Code Reuse—Sharing React™ software components across projects and brands improves productivity—but only if developers can find the software components and trust their quality and consistency. Electrode's™ archetypes ensure consistent structure, and tools like Electrode Explorer™ make it easy to search through thousands of components to find what is needed.

One of the most frequently touted benefits of Facebook's React™ library is that its component model encourages code reuse. React™ is a JavaScript library for building user interfaces (UI). Declarative views make the code more predictable and easier to debug. React™ allows developers to build encapsulated software components that manage their own state, then compose those encapsulated software components to make complex UIs. Since component logic is written in JavaScript instead of templates, it can easily pass rich data through the application and keep state out of the DOM. A Simple Component, React™ components implement a render( ) method that takes input data and returns what to display.

Figure 4:
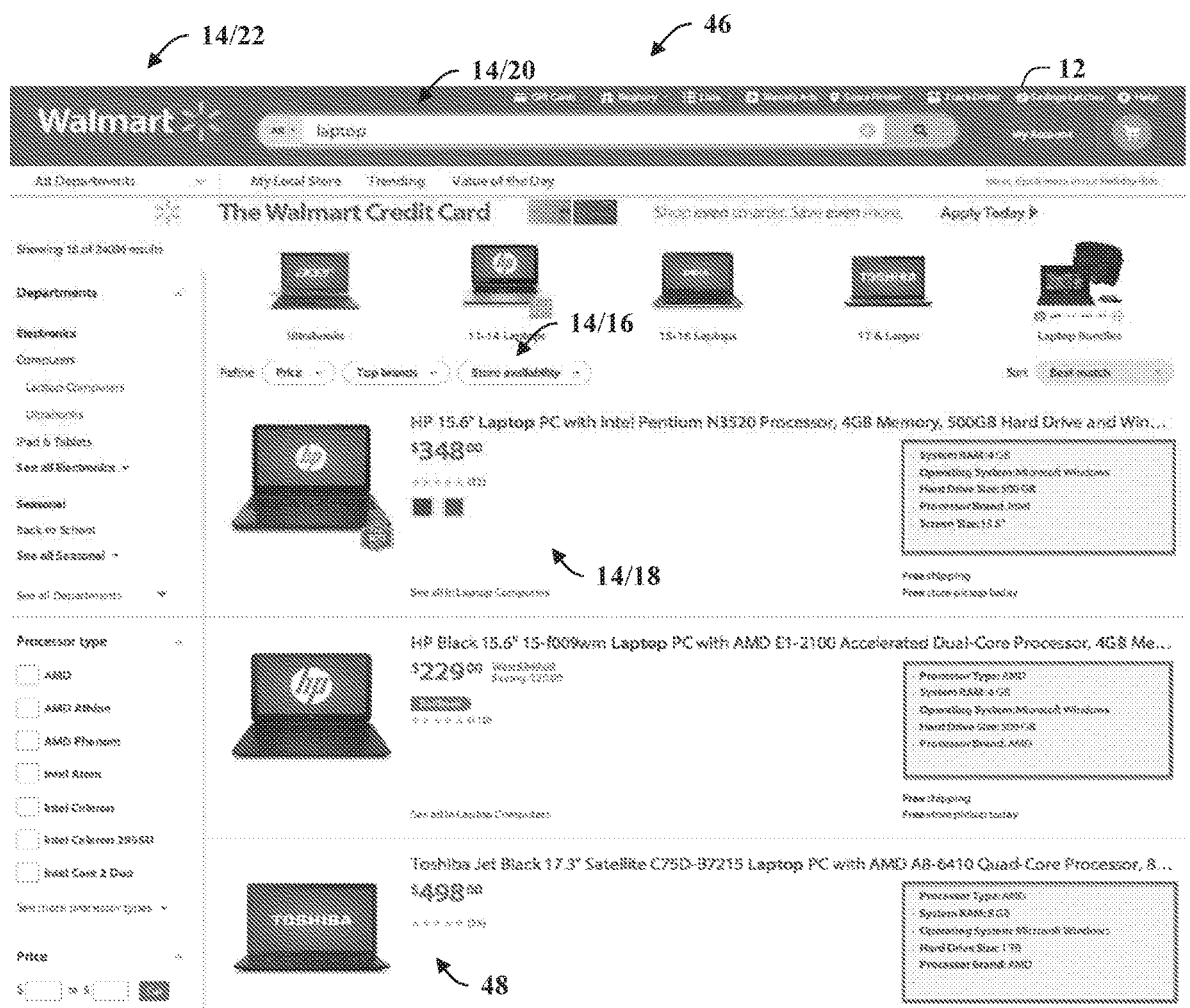

On a large scale, this means sharing software components across applications—for example, using a software component that generates a login box on a standalone login page and on a checkout page. With reference to FIG. 4, in one embodiment, for example, the system 10 may be configured to generate and display a website 12 that is composed of a plurality of software components 14 such as, for example, a chooser menu 16 that enables a user to select product categories to refine a product search, a product display 18 that displays product information in response to a product search request, a search field 20 that allows a user to input search terms for use by the system 10 to search and display relevant product information, and a logo frame 22 that displays a brand logo image. When implemented well, this code reuse can result in faster development time and fewer bugs. But while React™ components do provide the technical capability of reusing UI code, there are several obstacles to reusability in practice.

For example, software components can only be reused if they can be discovered. When an organization has hundreds of software components created across dozens of teams, it is difficult to find the one that solves a specific problem. In some cases there may be multiple possible solutions, each of which will need to be installed via an NPM default package manager for the JavaScript runtime environment Node.js. in order to see it and interact with it in context. This is time consuming for engineers, and for product managers and designers it's likely to be outside of the general workflow, even though knowing what software components look like and how they function would be useful to them.

Solving these issues is one of the goals of the system 10 that includes a React/Node.js application platform that powers Walmart.com™. @WalmartLabs™ has hundreds of components spread across dozens of GitHub™ repositories. To solve the discoverability problem, the system 10 of the present invention includes Electrode Explorer™, a standalone web application that consumes all of the data repositories in a GitHub™ organization and runs them as a website. There's no need to install components locally or search through repositories and all of the company's software components are visible in the web application, and can be searched, viewed, and interacted with in one place.

The system 10 automatically runs a demonstration of each software component in a component playground demonstration area, allowing the user to view the software component's integration and change its props to modify it in real time. If the software component has multiple major versions available via NPM, the system 10 allows user to switch between those versions to see what's changed.

The system 10 also displays each software component's documentation and dependencies, and the dependencies are color coded to notify the user if they're out of date. Finally, there are links to other applications using the software component that can be used as a reference implementation.

In the illustrated embodiment, the system 10 includes server computer system that is configured to execute a Electrode Explorer™ software application that displays software components via a website to allow users to search data repositories that include information associated with a plurality of software component programs, view software code associated with each software component, view demonstration images associated with the software components, and modify the software code and view changes in the corresponding demonstration images caused by the code modifications in real time. Software components include software code for use in generating graphical user interfaces that may be used in website design. For example, in one embodiment, a software component may include a graphical login prompt that may be displayed in several webpages. In another example, a software component may include a graphical chooser user interface 16 (shown in FIGS. 4-7) that may be displayed on a webpage. Software components may be reusable across a plurality of webpage designs, which enable code developers to reuse software component code to design and build webpages having consistent appearance and functionality.

Referring to FIG. 1, in the illustrated embodiment, the system 10 includes an explorer application server 24, a component database 26, a data repository server 28, a repository database 30, a website hosting server 32, and one or more user computing devices 34 that are each coupled in communication via a communications network 36. The communications network 36 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed. Each server may include a server computer that includes a processing device that includes a processor that is coupled to a memory device. The processing device executes various programs, and thereby controls components of the server according to user instructions received from the user computing devices and/or other servers. The processing device may include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device may also include a memory device for storing programs and information in one or more databases, and retrieving information from the databases that is used by the processor to perform various functions described herein. The memory device may include, but is not limited to, a hard disc drive, an optical disc drive, and/or a flash memory drive. Further, the memory device may be distributed and located at multiple locations.

The user computing device 34 may include any suitable device that includes a display device configured to display websites to the user and a user input device, such as, for example, a keyboard and/or mouse, that enables a user to access and communicate with the system 10 including sending and/or receiving information to and from the system 10 and displaying information received from the system 10 to a user. The user computing device 34 may include a processing device that includes a processor that is coupled to a memory device. The processing device executes various programs, and thereby controls components of the user computing device 34 according to user instructions received via the user input device and/or server computers. For example, in one embodiment, the user computing device 34 may include, but is not limited to, a desktop computer, a laptop or notebook computer, a tablet computer, smartphone/tablet computer hybrid, a personal data assistant, a handheld mobile device including a cellular telephone, and the like. In addition, the user computing device 34 may include a touchscreen that operates as the display device and the user input device.

The data repository server 28 includes a memory device that is connected to the repository database 30 to retrieve and store information contained in the repository database 30. The repository database 30 contains information on a variety of matters, such as, for example, information associated with webpages associated with one or more websites, software components, demonstration files, source code, integration code, object data, product images, product information, and/or any suitable information that enables the system 10 to function as described herein. The data and/or records contained in the repository database 30 may include searchable data terms including characters, symbols, letters, numbers, words, phrases, images, text data files, video data files, image data files, audio data files, and the like.

Figure 8:
FIGS. 8-9 are illustrations of exemplary database records generated by the system shown in FIG. 1, according to embodiments of the present invention.
Figure 9:
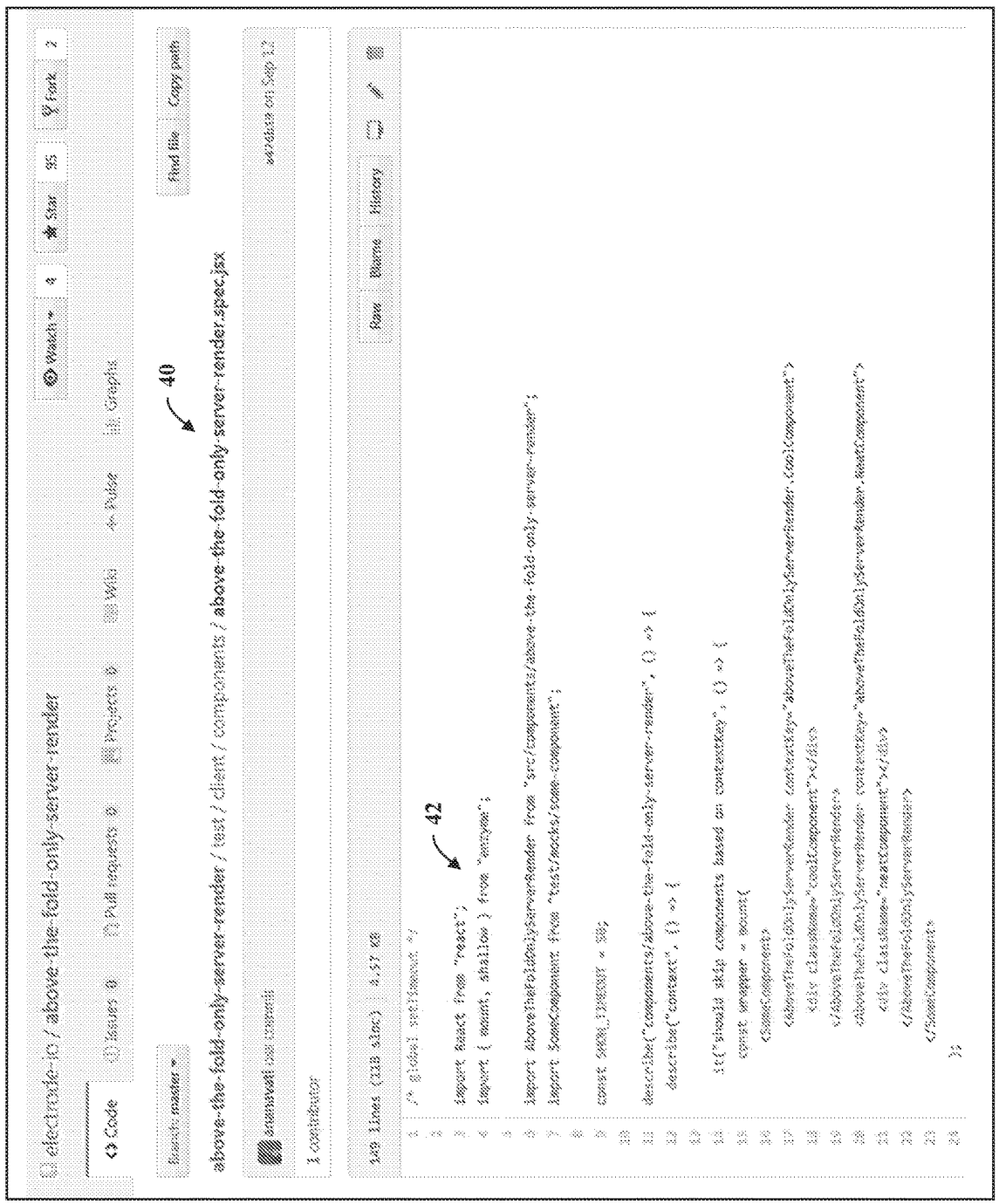

For example, in one embodiment, the repository database 30 may contain a plurality of data repositories 38 (shown in FIG. 8). Each data repository 38 includes one or more software component data files 40 associated with software components. In one embodiment, each data repository 38 includes an organization identifier and/or organization ID that includes a unique identifier associated with an organization. An organization may include, for example, a business entity and/or company organization that employs developers and/or software engineers to create information including source code associated with one or more software components and stores the information in data repositories associated with the organization in the repository database 30. Each software component data file 40 includes information associated with the corresponding software component including, but not limited to, software code 42 (shown in FIGS. 5, 6, and 9), source code, integration code, object data associated with a corresponding software component, and/or a unique component identifier 44 (shown in FIG. 5) such as, for example, a name, title, symbol, and/or any suitable unique identifier.

In addition, the software component data file 40 may include one or more component usage data files that includes software component documentation indicating a number of versions of the software component and information indicating a current version of the software component. The component usage data files may also include usage information including the identity of other software components currently using the corresponding software component and the version of the corresponding software component being used by the other software components. The component usage data files may also include dependency information including an identity of other software components being used by the corresponding software component and a version of each of the other software component being used by the corresponding software component. For example, in one embodiment, the component usage data files may include information associated with other software components using the corresponding software component. The component usage data files may also include information indicating a version of the corresponding software component being used by each of the other software components. Moreover, the software component data file 40 may include each previous version of the software code 42 associated with the software component.

In addition, in one embodiment, the software component data file 40 may also include component dependency data files that include information indicating other software components that are being used by the corresponding software component. The component dependency data files may also include information indicating a version of each of the other software components being used by the corresponding software component.

The website hosting server 32 is programmed to host a website 12 (shown in FIG. 4) that is accessible by a user via one or more user computing devices 34. The website hosting server 32 executes a website application program that retrieves software component data files 40 being stored in the repository database 30 and uses the software components to render one or more webpages on a display device of a user computing device 34 in response to requests received from the user via the user computing device 34 to allow users to interact with the website and search and/or purchase products such as, for example, goods and/or services via the website. In one embodiment, the website hosting server 32 is configured to generate and display web pages associated with the website in response to requests being received from consumers via corresponding web browsers that are displayed on the user computing devices 34. For example, in one embodiment, the website hosting server 32 may host an e-commerce website and display a product search webpage 46 (shown in FIG. 4) in response to receiving a user request that allows a user to input a product search request including search criteria including one or more search terms and retrieve and display product information associated with one or more products 48 in response to the user's search request. The website hosting server 32 may also allow the user to select one or more of the displayed products for purchase.

In the illustrated embodiment, the explorer application server 24 is programmed to host a component display website 50 (shown in FIG. 5) that is accessible by a user via one or more user computing devices 34. The component display website 50 allows a user to view information associated with software components using a web browser programmed installed on the user computing device 34. For example, in one embodiment, the explorer application server 24 is programmed to generate the component display website 50 to display software component software code 42 and a demonstration image 52, and allow the user to manipulate and/or change the software component software code 42 and view modifications to the demonstration image 52 that are caused by the corresponding modifications being made to the software component software code.

Figure 2:
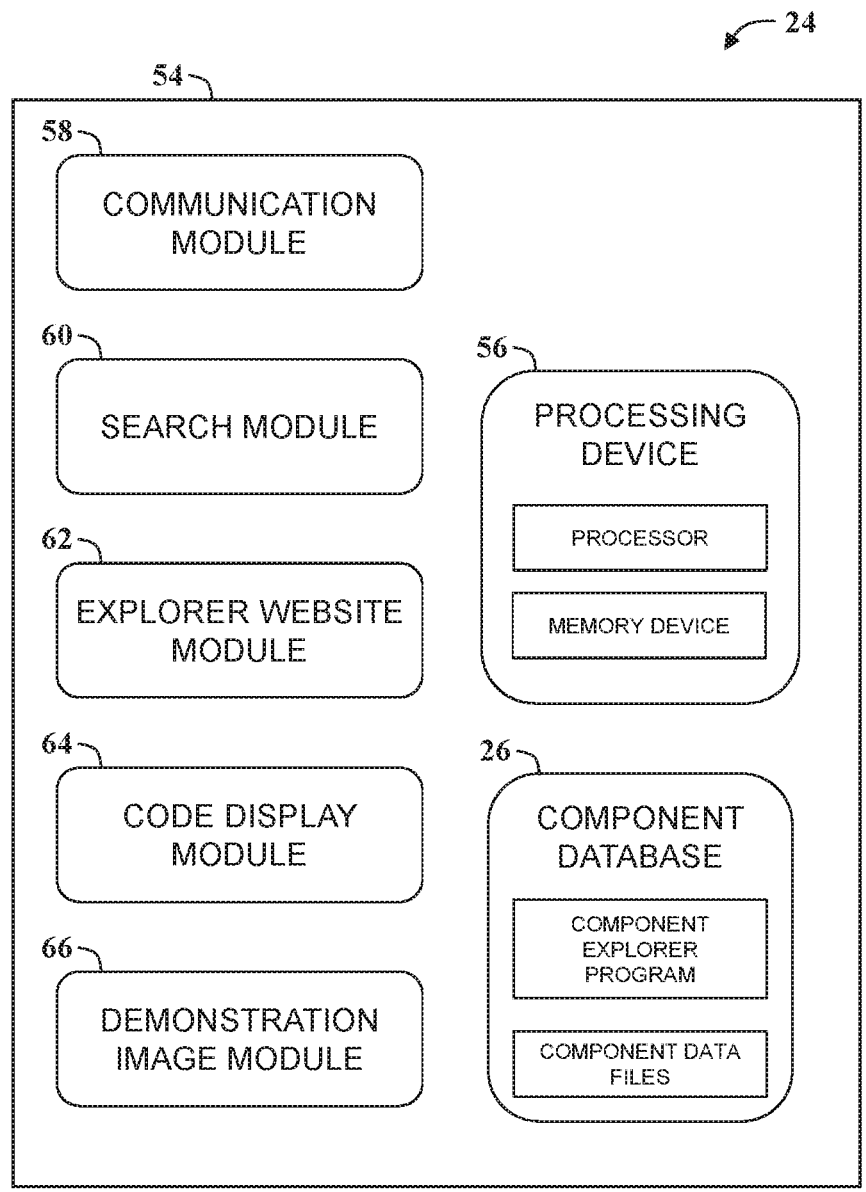
FIG. 2 is a schematic illustrating example components of a server computer that may be used with the system shown in FIG. 1, according to an embodiment of the present invention.

Referring to FIG. 2, in the illustrated embodiment, the explorer application server 24 includes a server computer 54 that includes a processing device 56 that is coupled to the component database 26, a communication module 58, a search module 60, an explorer website module 62, a code display module 64, and a demonstration image module 66. The processing device 56 includes one or more processors that are coupled to a memory device. In addition, the processing device 56 executes various programs, and thereby controls components of the server computer 54 according to user instructions received from the user computing devices 34 to enable users to interact with an operate the server computer 54. For example, in the illustrated embodiment, the processor is programmed to retrieve a component explore website application program that is being stored within the component database 26 and execute the component website application program to cause the processor to operate the server computer 54 to generate and display the component display website 50 on the user computing devices 34 using the web browser programmed installed on the user computing devices 34.

The communication module 58 retrieves various data and information from the data repository server 28 and/or the repository database 30 that may be used by the explorer application server 24 in generating information that is included in the component display website 50, and sends information to the user computing device 34 via the communications network 36 to display the component display website 50 on the user computing device 34 to enable the user to access and interact with the system 10 via the component display website 50. In one embodiment, the communication module 58 displays various images on a graphical interface of the user computing device 34 preferably by using computer graphics and image data stored in the component database 26 including, but not limited to, web pages, software component code, demonstration images, software component lists, software component documentation, and/or any suitable information and/or images that enable the system 10 to function as described herein.

The search module 60 is programmed to transmit a request to the data repository server 28 to access each data repository 38 being stored in the repository database 30 and retrieve, copy, and store each software component data file 40 into the component database 26. In one embodiment, the search module 60 receives a request to display the component display website 50 from a user computing device 34 including an organization ID, and transmits an access request to the data repository server 28 to retrieve the data repositories 38 associated with the received organization ID. In response to receiving the access request, the data repository server 28 accesses the repository database 30, retrieves each data repository 38 associated with the received organization ID, and transmits the retrieved data repositories 38, including each software component data file 40 to the explorer application server 24. The search module 60 then stores copies of each received data repository 38 in the component database 26. In one embodiment, the search module 60 may be programmed to periodically transmit an access request to the data repository server 28 at predefined time intervals such as, for example, hourly, daily, weekly, and/or at any suitable time interval. In addition, upon receiving the data repository 38 information from the data repository server 28, the search module 60 may update existing software component data files 40 to include the most current version of software code, documentation, object data, etc. In one embodiment, the search module 60 may also receive a request to retrieve data repositories 38 from a user via the component display website 50 and responsibly retrieve the data repositories 38 from the data repository server 28 upon receiving the request from the user.

In another embodiment, the data repository server 28 may be programmed to periodically transmit the data repositories 38 including the software component data files 40 to the explorer application server 24 for use in updating the software component data files 40 being stored in the component database 26. For example, in one embodiment, the data repository server 28 may be programmed to transmit the software component data files 40 when a new software component and/or a new version of an existing software component has been created and/or a new application and/or a new version of an existing software application has been created and stored in the repository database 30.

The explorer website module 62 is programmed to host the component display website 50 (shown in FIG. 5) that is accessible by a user via one or more user computing devices 34. The website hosting server 32 retrieves and stores information from the component database 26 and/or the repository database 30 that is associated with the component display website 50 in response to requests received by the user via the user computing device 34 to allow users to interact with the component display website 50. For example, in one embodiment, the explorer website module 62 may receive a request from a user computing device 34 such as, for example, a Uniform Resource Locator (url) request being transmitted from a web browser program being executed by the user computing device 34, and generate and transmit information to the user computing device 34 to cause the web browser program installed on the user computing device 34 to display the component display website 50 on the corresponding display device using the web browser program installed in the user computing device 34.

Figure 5:
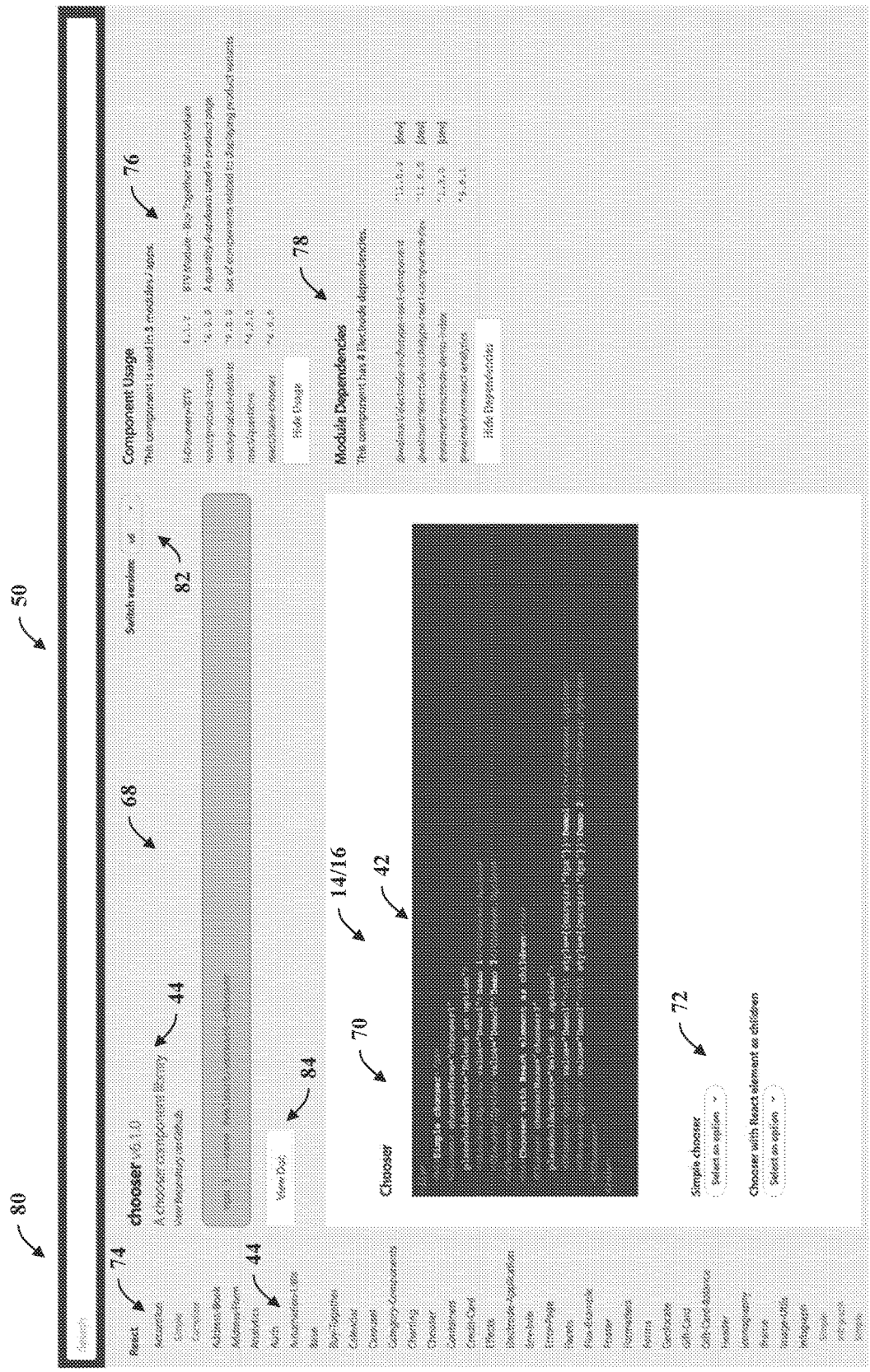

Referring to FIG. 5, in one embodiment, the explorer website module 62 is configured to generate and display the component display website 50 with a plurality of information display areas. For example, the component display website 50 may include information display areas including one or more component display areas 68 displaying information associated with one or more software components 14 including, but not limited to, a software component identifier, a current version of the software component, hyperlinks to software component documentation stored in corresponding software component data files 40, a code display area 70 including software code 42 associated with a corresponding software component 14, a demonstration area 72 including a demonstration image 52 of the corresponding software component 14, a software component listing area 74 that includes a list of software components 14 included in the data repositories 38 associated with an organization, a component usage display area 76 including information indicating other software components that are using the corresponding software component, and a component dependency display area 78 that includes information indicating each software components being used by the corresponding software component.

In one embodiment, the explorer website module 62 may display the component display website 50 including a component search field 80 that allows a user to input search criteria into the component search field 80 and transmit a search request to the search module 60. Upon receiving the search request including the user search criteria, the search module 60 may access the component database 26 to retrieve software components having information matching the search criteria, and generate and display component display areas 68 that include information included in the software component data files 40 associated with the selected software components.

The code display module 64 is configured to access one or more data repositories 38 being stored in the component database and retrieve the software component data files 40 associated with the software components 14. The code display module 64 renders a code display area 70 within the component display area 68 for each of the software components and displays the corresponding software code 42 associated with a software component within the code display area 70. In one embodiment, the code display module 64 may display a version selector 82 to allow a user to select a version of the software code to be displayed within the code display area 70. For example, the code display module 64 may access a software component data file 40, determine a number of versions of the software code that are associated with the corresponding software component and display the version selector 82 including a drop down menu including a listing of each version of the software component. Upon receiving a user selection of a version of the software component, the code display module 64 retrieves and displays the selected version of the software code 42 in the code display area 70.

In addition, for each software component included in the data repositories 38, the code display module 64 accesses the software component data files 40 to determine the software component identifier 44 associated with the corresponding software component, a current version of the software component, and software component documentation associated with the corresponding software component, and displays the software component identifier 44, the current version, and a documentation hyperlink 84 within the component display area 68. Upon selection of the documentation hyperlink 84 by a user, the code display module 64 is configured retrieve the component documentation from the software component data file 40 and display the documentation on the component display website 50.

In one embodiment, the code display module 64 is configured to retrieve a software component identifier 44 for each software component included in the data repositories 38 and render and display a software component list in the component listing area 74 on the component display website 50 that includes each component identifier 44 associated with each software component included in the each of the data repositories 38. In addition, the code display module 64 displays each component identifier 44 with a hyperlink to allow a user to request the system 10 to display information associated with a corresponding software component by selecting the corresponding component identifier 44. For example, upon receiving a receiving a user selection of an associated component identifier, the code display module 64 accesses the software component data files 40 associated with the selected software component identifier 44 and renders and displays a corresponding component display area 68 including the information associated with the corresponding software component.

The code display module 64 may also be configured to retrieve a software component data file 40 from the component database 26, access a component usage data file included in the a software component data file 40 and determine the other software components that are using the corresponding software component. The code display module 64 may generate usage information indicating the other software components using the corresponding software components and display a component usage display area 76 including each of the other software components using the corresponding software component. In addition, the code display module 64 may determine a version of the corresponding software component being used by each of the other software components and display the component usage display area 76 including each version of the corresponding software component being used by each of the other software components.

In addition, the code display module 64 may be configured to determine if each version of the corresponding software component being used by each of the other software components is a current version of the corresponding software component and display a notification upon determining that a version of the corresponding software component being used by another software component is not the current version. For example, in one embodiment, the notification may include, but is not limited to, displaying a text notifying to the user, and/or displaying the version in highlighted text format such as bold, underline, italics, color coded, etc.

The code display module 64 may also be configured to retrieve a software component data file 40 from the component database 26, access a component dependency data file included in the a software component data file 40, and determine the other software components being used by the corresponding software component. The code display module 64 may generate component dependency information indicating the other software components being used by the corresponding software component and display a component dependency display area 78 including a dependency list 86 including each of the other software components being used by the corresponding software component. In addition, the code display module 64 may determine a version of each of the other software components being used by the corresponding software component and display the dependency list 86 of software components including each corresponding version. The code display module 64 may also display a notification upon determining that a version of the other software components being used by the corresponding software component is not a current version of the other software component.

The demonstration image module 66 is configure to execute the software code 42 associated with the software component being displayed in the code display area 70 and render a demonstration image 52 of the software component in the demonstration area 72. For example, in one embodiment, the demonstration image module 66 may execute the software code 42 being displayed in code display area 70, access the object data being stored in the corresponding software component data file 40, and render the demonstration image 52 using the software code 42 and the retrieved object data.

Figure 6:
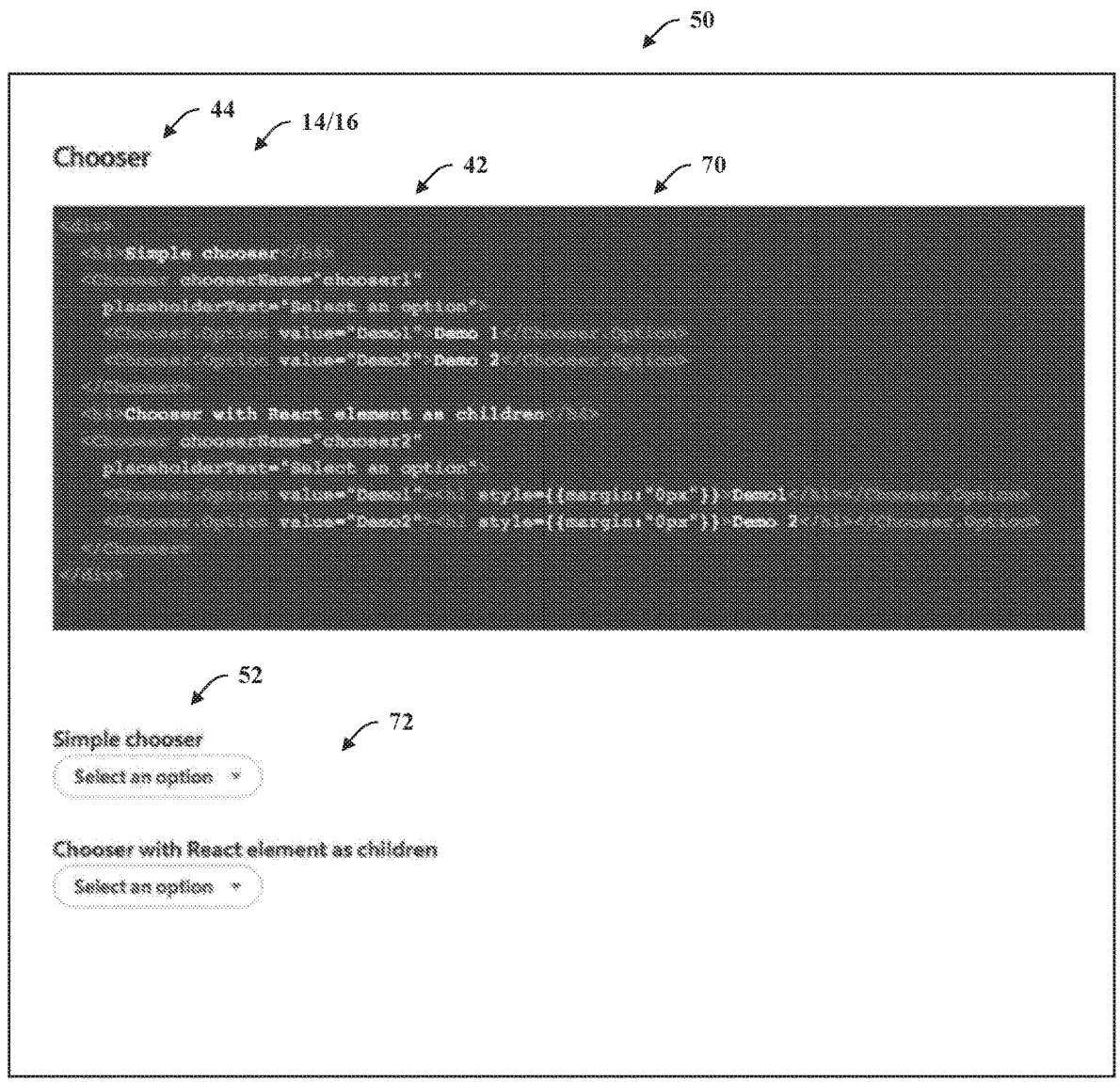

In the illustrated embodiment, the code display module 64 allows the user to modify and/or change the software code 42 being displayed in the code display area 70. Upon detecting a modification to the software code 42, the demonstration image module 66 executes the modified software code and displays a modified demonstration image. For example, the code display module 64 may receive a signal from a user via a user computing device indicating a modification of the corresponding software code being displayed in the code display area 70. The demonstration image module 66 executes the modified software code including the modification and renders a modified demonstration image to display changes in the software component caused by the modification of the corresponding software code. Referring to FIG. 6, for example, modifying line 2 of the software code "<h4>Simple chooser</h4>" to include "<h4>Chooser Sample</h>" will cause the text "Simple chooser" in the demonstration image to change to "Chooser Sample".

In one embodiment, the system 10 may allow a user to save the modified software code in the corresponding software component data file 40. The system 10 may also allow the user to display previous versions of software component software code in the code display area 70 and modify the previous versions of code to view changes in the demonstration image of the software component caused by the code modifications. By displaying the modified demonstration image when the code modification occurs, the demonstration image module 66 allows the user to view the changes in the software component that are caused by the code modifications in real time.

Figure 3:
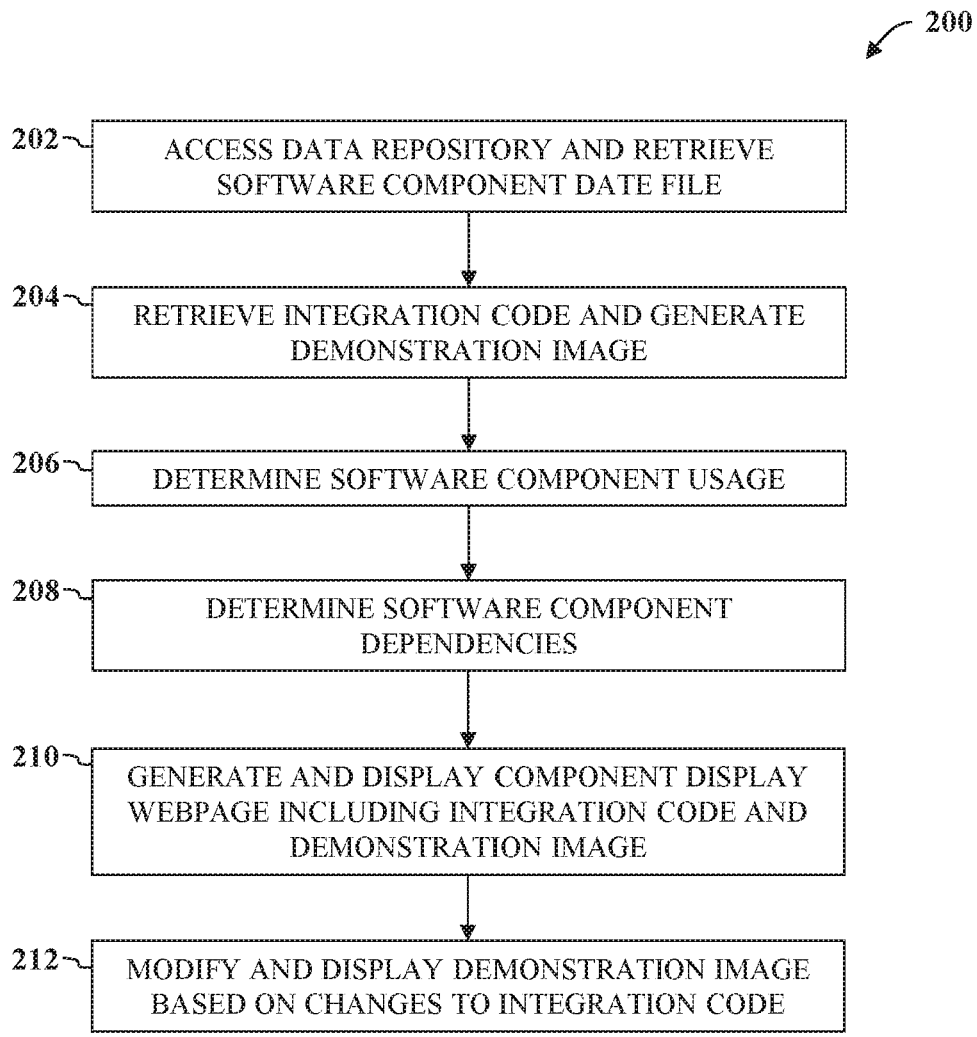
FIG. 3 is a flowchart of a method that may be used with the system shown in FIG. 1, according to an embodiment of the present invention.

FIG. 3 is a flowchart of method 200 that may be used to operate the system 10 to access, modify, and display software components that are used to generate websites. The method includes a plurality of steps. Each method step may be performed independently of, or in combination with, other method steps. Portions of the methods may be performed by any one of, or any combination of, the components of the system 10. FIGS. 5-7 are exemplary graphical displays that may be displayed by the system 10.

Referring to FIG. 3, in the illustrated embodiment, in method step 202, the server computer 54 receives a request from a user to display software components. For example, in one embodiment, the server computer 54 may receive a url request associated with the component display website 50 from a user computing device 34. In response to receiving the request, the server computer 54 accesses the component database 26 and retrieves the data repositories 38 that may be used to generate the component display web site 50.

In one embodiment, upon receiving a request to display the component display website 50, the server computer 54 may prompt the user to provide an organization ID. Upon receiving the organization ID, the server computer 54 transmits a request to the data repository server 28 to access data repositories 38 associated with the organization ID being stored in the repository database 30. The data repository server 28 may verify the received organization ID and transit the data repositories 38 associated with the organization ID to the server computer 54. Upon receiving the data repositories 38 from the data repository server 28, the server computer 54 stores copies of the received data repositories 38 in the component database 26.

In method step 204, the server computer 54 accesses a data repository 38 being stored in the component database and retrieves a software component data file 40. The server computer 54 retrieves a current version of software code 42 associated with a corresponding software component included in the software component data file 40 and executes the software code and object data to render a demonstration image 52 of the corresponding software component. In addition, the server computer 54 may generate a software component list including a component identifier associated with each software component included in the each of the data repositories.

In method step 204, the server computer 54 determines the software component usage of the corresponding software component by accesses a component usage data file included in the software component data file 40 and determines the other software components that are using the corresponding software component.

In method step 208, the server computer 54 determines software component decencies of the corresponding software component by accesses a component dependency data file included in the software component data file 40 and determines each software component being used by the corresponding software component.

In method step 210, the server computer 54 generates the component display website 50 including a component display area 68 associated with the corresponding software component. The server computer 54 also renders a code display area 70 within the component display area 68 and displays the corresponding software code 42 within the code display area 70, and renders a demonstration area 72 within the component display area 68 and displays the demonstration image 52 within the demonstration area 72. In addition, the server computer 54 displays a software component list 74 on the component display website 50 including a component identifier 44 associated with each software component included in the each of the data repositories 38.

The server computer 54 may also display a component usage display area 76 including each of the other software components using the corresponding software component and each version of the corresponding software component being used by each of the other software components. In addition, the server computer 54 displays a notification upon determining a version of the corresponding software component being used by another software component is not the current version.

The server computer 54 may also display a component dependency display area 78 including each of the other software components being used by the corresponding software component and each of the versions of the other software components being used by the corresponding software component.

The server computer 54 also generates and transmits information associated with the component display website 50 to the user computing device 34 to cause a web browser program installed on the user computing device 34 to display the component display website 50 on the display device of the user computing device 34.

In method step 212, the server computer 54 receives a signal from a user via a user input device indicating a modification of the corresponding software code and executes a modified software code including the modification and renders a modified demonstration image to display changes in the software component caused by the modification of the corresponding software code.

INDUSTRIAL APPLICABILITY

With reference to FIG. 1-14, operation of the system 10 according to one embodiment is shown. The system 10 may be used to view all the software components in an organizations repository database, view and modify the software component code and view the changes in the component images caused by the modifications in real time, read the component documentation, and view the different versions of the software component via a web browser.

The system provides a central webpage that allows users to 1) view demonstrations of all the software components under the organizations that have been specified by the user; 2) view documentations of the software components; 3) view dependencies that the software components have (dependencies); and 4) view other software components/applications that depend on the corresponding software components (usages).

In one embodiment, the system 10 allows two ways in which the software component versions can update dynamically: Method #1) add GitHub hooks to send POST requests to /api/update/{org}/{repoName} when a new tag is created; and Method #2) Enable ./server/poll plugin to set up cron job that sends the POST requests every day.

It's recommended to use Method #1 to allow the system to display updates in near real time.

After the explorer application server receives the POST request, it will fetch the package.json file under your-GithubUrl/org/repoName, update data/orgs.json and data/{org}/{repoName}.json files. If there is a newer version, it will try to download the new component through npm (scripts/install-module.sh) after a waiting period, babel transpile, and webpack the demo module (scripts/post-install-module.sh).

To make the server update immediately or force an update, add a url parameter to the POST request, /api/update/{org}/{repoName}?updateNow=1.

This post processing script works well with all electrode components (meaning components using a predefined archetype). If non-electrode components are used, modify the scripts/post-install-module.sh to babel transpile and bundle demo non-electrode component files.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
   one or more processors; and
   one or more non-transitory memory storage devices storing computer instructions configured to run on the one or more processors and to perform:
      accessing a data repository of a plurality of data repositories comprising at least one software component data file associated with a software component comprising a software code and an object data;
      retrieving the at least one software component data file;
      executing the software code and the object data associated with the at least one software component data file to render a first demonstration image of the software component associated with the at least one software component data file;
      generating a component display website comprising a component display area showing a second demonstration image of the software component associated with the at least one software component data file, wherein the second demonstration image reflects one or more modifications to the software code of the software component of the at least one software component data file;
      executing the software code, as modified, comprising the one or more modifications to render the second demonstration image to display changes in the software component caused by the one or more modifications of the software code associated with the at least one software component data file; and sending instructions to purchase the software code, as modified.

2. The system of claim 1, wherein the computer instructions are further configured to perform:
receiving one or more signals from a user via a user input device to indicate the one or more modifications of the software code associated with the at least one software component data file and to render the second demonstration image displayed with the changes in the software component, as modified.

3. The system of claim 1, wherein the computer instructions are further configured to perform generating a software component list displayed on the component display website, the software component list comprising a component identifier associated with each software component included in each of the plurality of data repositories.

4. The system of claim 3, wherein the computer instructions are further configured to perform generating each component identifier with a hyperlink, and the computer instructions are further configured to perform displaying the component display area upon receiving a selection by a user of a particular one of the component identifiers.

5. The system of claim 1, wherein the at least one software component data file comprises a component usage data file comprising information associated with other software components being used with the software component associated with the at least one software component data file, and the computer instructions are further configured to perform displaying a component usage display area comprising each of the other software components being used with the software component associated with the at least one software component data file.

6. The system of claim 5, wherein the component usage data file further comprises information indicating a version of the software component associated with the at least one software component data file being used by the each of the other software components, and the computer instructions are further configured to perform displaying the component usage display area comprising each version of the software component associated with the at least one software component data file being used by the each of the other software components.

7. The system of claim 6, wherein the at least one software component data file further comprises information indicating a current version of the software component, and the computer instructions are further configured to perform generating a notification to be displayed upon determining a version of the software component associated with the at least one software component data file being used by another software component is not the current version.

8. The system of claim 1, wherein the at least one software component data file comprises a component dependency data file comprising information indicating other software components being used by the software component associated with the at least one software component data file, and the computer instructions are further configured to perform displaying a component dependency display area comprising other software components being used by the software component associated with the at least one software component data file.

9. The system of claim 8, wherein the component dependency data file further comprises information indicating a version of each of the other software components being used by the software component associated with the at least one software component data file, and the computer instructions are further configured to perform displaying the component dependency display area comprising each of the versions of the other software components being used by the software component associated with the at least one software component data file.

10. One or more non-transitory computer-readable storage media, having computer-executable instructions embodied thereon and configured to run on at least one processor to cause the processor to:
accessing a data repository of a plurality of data repositories comprising at least one software component data file associated with a software component comprising a software code and an object data;
retrieving the at least one software component data file;
executing the software code and the object data associated with the at least one software component data file to render a first demonstration image of the software component associated with the at least one software component data file;
generating a component display website comprising a component display area showing a second demonstration image of the software component associated with the at least one software component data file, wherein the second demonstration image reflects one or more modifications to the software code of the at least one software component data file;
executing the software code, as modified, comprising the one or more modifications to render the second demonstration image to display changes in the software component caused by the one or more modifications of the software code associated with the at least one software component data file; and
sending instructions to purchase the software code, as modified.

11. The one or more non-transitory computer-readable storage media of claim 10, wherein the computer-executable instructions further cause the processor to:
receive one or more signals from a user via a user input device to indicate the one or more modifications of the software code associated with the at least one software component data file and to render the second demonstration image displayed with changes in the software component, as modified.

12. The one or more non-transitory computer-readable storage media of claim 10, wherein the computer-executable instructions further cause the processor to generate a software component list displayed on the component display website, the software component list comprising a component identifier associated with each software component included in each of the plurality of data repositories.

13. The one or more non-transitory computer-readable storage media of claim 12, wherein the computer-executable instructions further cause the processor to perform generating each component identifier with a hyperlink, and the computer-executable instructions further cause the processor to perform displaying the component display area upon receiving a selection by a user of a particular one of the component identifiers.

14. The one or more non-transitory computer-readable storage media of claim 10, wherein the at least one software component data file comprises a component usage data file comprising information associated with other software components being used with the software component associated with the at least one software component data file, and the computer-executable instructions further cause the processor to perform displaying a component usage display area comprising each of the other software components being used with the software component associated with the at least one software component data file.

15. The one or more non-transitory computer-readable storage media of claim 14, wherein the component usage data file further comprises information indicating a version of the software component associated with the at least one software component data file being used by the each of the other software components, and the computer-executable instructions further cause the processor to perform displaying the component usage display area comprising each version of the software component associated with the at least one software component data file being used by the each of the other software components.

16. The one or more non-transitory computer-readable storage media of claim 15, wherein the at least one software component data file comprises information indicating a current version of the software component, and the computer-executable instructions are further cause the processor to perform generating a notification to be displayed upon determining a version of the software component associated with the at least one software component data file being used by another software component is not the current version.

17. The one or more non-transitory computer-readable storage media of claim 10, wherein the at least one software component data file comprises a component dependency data file comprising information indicating other software components being used by the software component associated with the at least one software component data file, and the computer-executable instructions further cause the processor to display a component dependency display area comprising other software components being used by the software component associated with the at least one software component data file.

18. The one or more non-transitory computer-readable storage media of claim 17, wherein the component dependency data file further comprises information indicating a version of each of the other software components being used by the software component associated with the at least one software component data file, and the computer-executable instructions further cause the processor to perform displaying the component dependency display area comprising each of the versions of the other software components being used by the software component associated with the at least one software component data file.

19. A method being implemented via execution of computing instructions configured to run at one or more processors and stored at one or more non-transitory computer-readable media, the method comprising:
accessing a data repository of a plurality of data repositories comprising at least one software component data file associated with a software component comprising a software code and an object data;
retrieving the at least one software component data file;
executing the software code and the object data associated with the at least one software component data file to render a first demonstration image of the software component associated with the at least one software component data file;
generating a component display website comprising a component display area showing a second demonstration image of the software component associated with the at least one software component data file, wherein the second demonstration image reflects one or more modifications to the at least one software component data file;
executing the software code, as modified, comprising the one or more modifications to render the second demonstration image to display changes in the software component caused by the one or more modifications of the software code associated with the at least one software component data file; and
sending instructions to purchase the software code, as modified.

20. The method of claim 19 further comprising:
the one or more processors receiving one or more signals from a user via a user input device to indicate one or more modifications of the software code associated with the at least one software component data file and to render the second demonstration image displayed with changes in the software component, as modified.

* * * * *